United States Patent [19]

Baker

[11] Patent Number: 4,506,969

[45] Date of Patent: Mar. 26, 1985

[54] FILM-WIDTH AND TRANSMITTANCE SCANNER SYSTEM

[75] Inventor: Richard W. Baker, Anoka, Minn.

[73] Assignee: Pako Corporation, Minneapolis, Minn.

[21] Appl. No.: 595,995

[22] Filed: Apr. 2, 1984

[51] Int. Cl.[3] ...................... G03D 13/00; G01B 11/04

[52] U.S. Cl. .................................... 354/298; 250/560; 356/385; 364/563

[58] Field of Search ................ 354/298; 250/560, 561; 356/384-386; 364/563

[56] References Cited

U.S. PATENT DOCUMENTS

| | | | |
|---|---|---|---|
| 3,472,143 | 10/1969 | Hixon et al. | 95/89 |
| 3,554,109 | 1/1971 | Street | 95/89 |
| 3,559,555 | 2/1971 | Street | 95/89 |
| 3,787,689 | 1/1974 | Fidelman | 250/219 |
| 3,927,417 | 12/1975 | Kinoshita et al. | 354/298 |
| 4,057,818 | 11/1977 | Gaskell et al. | 354/298 |
| 4,104,670 | 8/1978 | Charnley et al. | 354/324 |
| 4,119,952 | 10/1978 | Takahashi et al. | 340/309.1 |
| 4,128,325 | 12/1978 | Melander et al. | 354/298 |
| 4,134,663 | 1/1979 | Laar et al. | 354/298 |
| 4,174,169 | 11/1979 | Melander et al. | 354/324 |

*Primary Examiner*—William B. Perkey
*Attorney, Agent, or Firm*—Kinney & Lange

[57] ABSTRACT

A graphic arts film processor includes a scanner which measures the transmittance of light through the film along a line or a set of parallel lines positioned at a skew angle A with respect to the direction of film travel. A film switch is located at the upstream end of the scanner. The film width is determined based upon the skew angle A, the film transport speed and time intervals between changes in the signals from the scanner and the film switch which correspond to the leading and trailing ends of the film. The film length is determined based upon the transport speed and a time interval between changes in the signal from the film switch corresponding to the leading and trailing ends. Developer replenishment is controlled based upon an integrated transmittance complement measured by the scanner, and fix replenishment is controlled as a function of the film length, the film width, and the integrated transmittance complement.

33 Claims, 13 Drawing Figures

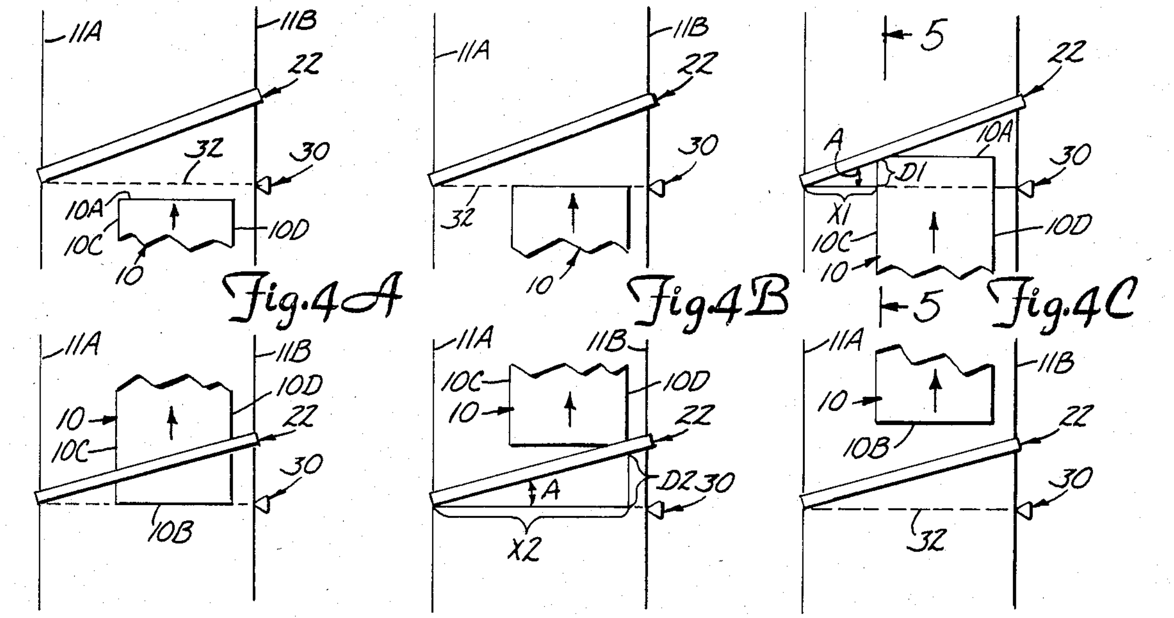
Fig.4A Fig.4B Fig.4C
Fig.4D Fig.4E Fig.4F
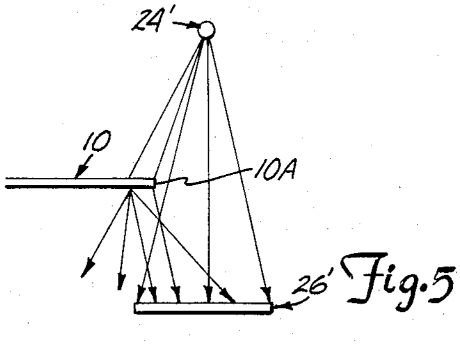
Fig.5
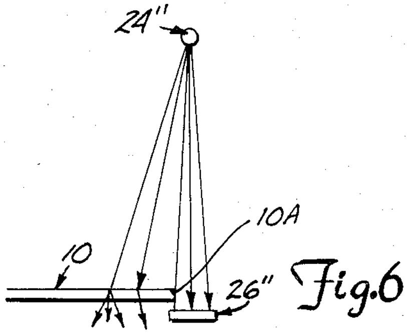
Fig.6
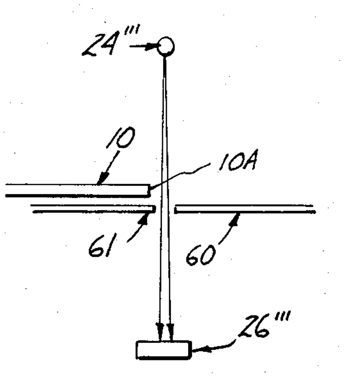
Fig.7
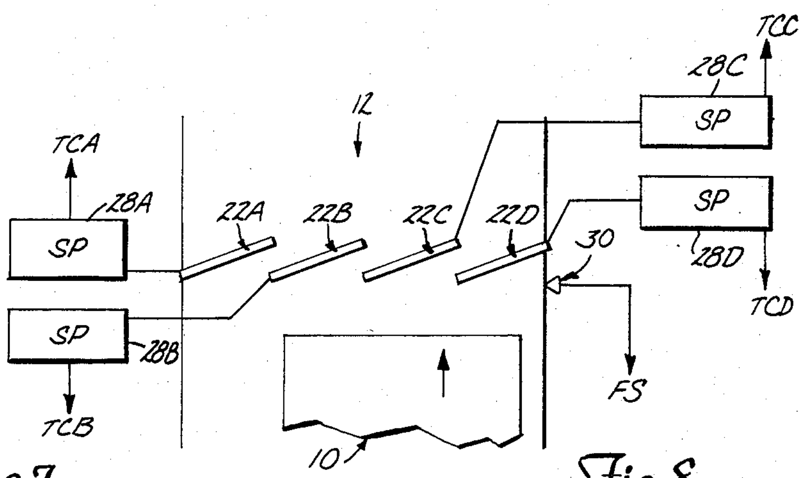
Fig.8

FILM-WIDTH AND TRANSMITTANCE SCANNER SYSTEM

BACKGROUND OF THE INVENTION

1. Field of the Invention.

The present invention relates to automatic replenishment systems for processors of photosensitive material. In particular, the present invention relates to an improved film width and transmittance scanning system for controlling developer and fix replenishment in a graphic arts film processor.

2. Description of the Prior Art.

Graphic arts film processors require replenishment of developer and fix to compensate for changes in the chemical activity resulting from the processing of photosensitive film. Replenishment systems were originally manually operated. The operator would visually inspect the film being processed and would manually operate the replenishment systems as he deemed necessary. The accuracy of these types of manual replenishment systems was obviously based upon the skill of the operator.

In recent years, automatic replenishment systems have found increasing use. These systems typically utilize film transmittance measurements to control the operation of the replenishment system. Examples of automatic replenishment systems are shown in U.S. Pat. No. 4,104,670 to Charnley et al, U.S. Pat. No. 4,057,818 to Gaskell et al, U.S. Pat. No. 4,128,325 to Melander et al and U.S. Pat. No. 4,174,169 to Melander et al. All of these patents are assigned to the same assignee as the present application. Other examples of automatic replenishment systems may be found in U.S. Pat. No. 3,472,143 to Hixon et al, U.S. Pat. No. 3,554,109 to Street et al, U.S. Pat. No. 3,559,555 to Street; U.S. Pat. No. 3,561,344 to Frutiger et al, U.S. Pat. No. 3,696,728 to Hope, U.S. Pat. No. 3,787,689 to Fidelman, U.S. Pat. No. 3,927,417 to Kinoshita et al, U.S. Pat. No. 4,119,952 to Takahashi et al and U.S. Pat. No. 4,134,663 to Laar et al.

In a typical graphic arts automatic replenishment system, a scanner is used to measure transmittance of the film after it has been developed. The scanner includes a light source positioned on one side of the film path, and a light receiver sensing strip positioned on the opposite side of the film path. The amount of light which passes from the light source to the sensing strip is modulated by the film passing inbetween. This is a measurement of transmittance (T), which is the ratio of "transmitted" to "initial" illuminance.

One of the basic types of graphic arts film is half-tone film, which when developed consists of varying sizes of discrete dots. In half-tone film, if a spot is developed at all, it is completely developed, and if a spot is clear, it is completely clear. For example, for a film with "30% dot", thirty percent of the silver has been developed, and this covers thirty percent of the film. With thirty percent of the surface of the film opaque, thirty percent of the incident light will be blocked and seventy percent of the incident light will be detected by the sensing strip. In terms of the definition of transmittance, if the light source prior to film arrival ("no film") is normalized to one hundred percent (100%), and seventy percent (70%) of the light is transmitted, then the ratio of the transmittance to the initial illuminance is seventy percent (i.e. T=70%).

Developer replenishment is based on the amount of silver that was developed and is blocking light. In a half-tone film, developer replenishment is proportional to the percentage dot, that is porportional to one hundred percent minus average percentage transmittance. In the example given above, in which transmittance is seventy percent, thirty percent of the maximum developer replenishment volume recommended for a totally exposed film must be used. The maximum developer replenishment volume recommended for a totally exposed half-tone film is used.

Fix replenishment is often tied directly to developer replenishment, but in fact fix replenishment is inversely related to percentage dot. Accurate fix replenishment requires that the total area of the film and the percentage dot both be known, since the amount of fix which has been exhausted depends upon the clear area of the film after developing.

SUMMARY OF THE INVENTION

The present invention is an automatic replenishment system which determines film width, film length, and film transmittance for use in controlling replenishment in a graphic arts film processor. The present invention includes scanner means for scanning the transport path in a field of vision which is oriented at a skew angle with respect to the transport direction of the film. The system also includes a film switch positioned along the transport path at a predetermined location with respect to the field of vision.

Based upon signals from the scanner means and the film switch, first, second and third elapsed times are measured. The first elapsed time begins when the leading edge of the film reaches the film switch detector and ends when the leading edge of the film enters the field of vision of the scanner means. The second elapsed time begins when the leading edge of the film reaches the film switch and ends when the trailing edge of the film passes the film switch. The third elapsed time begins when the trailing edge passes the film switch and ends when the trailing edge passes out of the field of vision of the scanner means.

Width determining means determines the width of the film as a function of the first and third elapsed times, the skew angle, and the transport speed of the film. Length determining means determines the length of the film as a function of the second elapsed time and the transport speed.

A scanner signal from the scanner means is integrated over the time during which the film is within the field of vision, and developer replenishment control signals are produced as a function of the integrated signal. Fix replenishment control signals are produced as a function of length, width, and the integrated signal.

BRIEF DESCRIPTION OF THE DRAWINGS

FIGS. 4A through 4F show diagrammatically the movement of film through the scanner system of FIG. 2.

FIGS. 5, 6 and 7 show sectional views along section 5—5 of FIG. 4C of various configurations of the light source and receiver of the scanner system.

FIG. 8 shows another preferred embodiment of the scanner system.

DETAILED DESCRIPTION OF THE PREFERRED EMBODIMENTS

Figure 1:
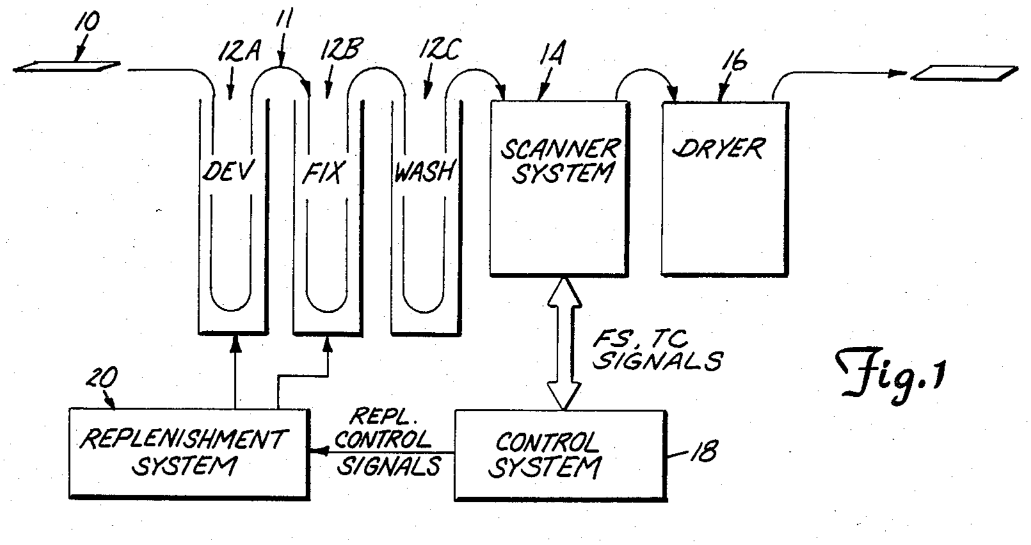
FIG. 1 is a block diagram of a graphic arts film processor.

FIG. 1 shows a graphic arts film processor which processes sheets or webs of exposed photosensitive film 10. Film 10 is transported along a transport path 11 through developer, fix and wash tanks 12A, 12B and 12C, through scanner system 14, and through dryer 16.

In accordance with the present invention, scanner system 14 produces output signals in the form of a transmittance complement (TC) signal and a film switch (FS) signal from which width, length and percent dot of film 10 can be derived. Control system 18 derives the width, length and percent dot from the TC and FS signals, and provides replenishment control signals to replenishment system 20. The appropriate amounts of developer and fix replenishment are provided by replenishment system 20 to tanks 12A and 12B, respectively, based upon the replenishment control signals.

Figure 2:
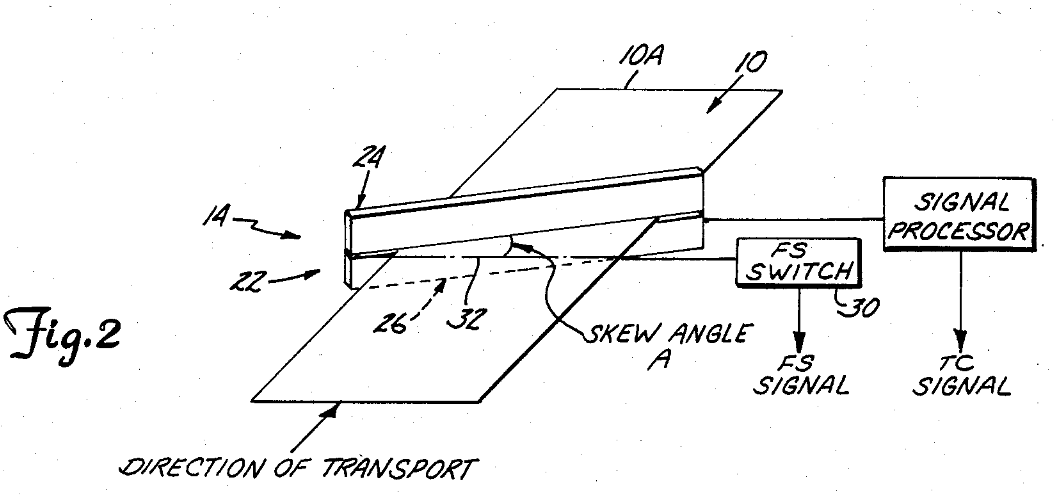
FIG. 2 is a diagram of a preferred embodiment of the scanner system of the present invention.

FIG. 2 shows one preferred embodiment of scanner system 14 of the present invention, which includes scanner 22 (formed by lignt source 24 and light sensing strip or receiver 26), signal processor 28, and film switch 30. Light source 24 and receiver 26 of scanner 22 are positioned on opposite sides of the film path, so that film 10 passes between them as it passes through scanner system 14. Light source 24 produces a beam of light which is of essentially uniform intensity along the entire width of light source 24. Receiver 26 is positioned directly opposite light source 24 to receive the light beam. In a preferred embodiment of the present invention, receiver bar 26 comprises a continuous strip of photovoltaic cells positioned with either no gap between adjacent cells, or with a very small gap between adjacent cells, so that receiver 26 has essentially uniform response along its entire width. The photovoltaic cells forming receiver 26 are connected in parallel, so that the output of receiver 26 which is provided to signal processor 28 represents an integration of the intensity of the light received by receiver 26 along its entire width.

In the present invention, scanner 22 is sensitive enough to detect the difference between "no film" and "clear film" conditions. "No film" conditions occur when there is no film positioned between light source 24 and receiver 26. "Clear film" conditions means that there is a film 10 positioned between light source 24 and receiver 26, but the film has zero percent (0%) dot. In other words, clear film corresponds to film base, with no developed image.

The output of receiver 26 is at a maximum when there is no film present between light source 24 and receiver 26. When film 10 is present between light source 24 and receiver 26, the total amount of light received by receiver 26 is decreased, some of the reduction in light intensity as a result of reflection and dispersion effects of the film base (which distinguishes "clear film" from "no film" conditions). In addition, the amount of developed silver on film 10 determines how much of the light from light source 24 is blocked. The higher the percent dot, the greater the amount of light which is blocked, and the lower the output of receiver 26. The output of receiver 26 at any given instant in time is the integral of the light transmitted minus the light reflected, dispersed and blocked over the entire width of receiver 26 (and not just the width of the film). Signal processor 28 complements the output of receiver 26 (by level shifting and inverting) to produce the transmittance complement (TC) signal. This TC signal represents one hundred percent minus percent transmittance (i.e. TC=100%−T%) as measured by scanner 22.

As shown in FIG. 2, in the present invention light source 24 and receiver 26 are oriented at a skew angle A with respect to a transverse direction to movement of film 10. Due to this skewed orientation, scanner 22 and film switch 30 provide all of the information necessary to determine film width, film length and percent dot. This greatly simplifies the construction of scanner system 14, reduces parts count and parts cost, and provides more accurate replenishment than prior art systems, in which a light source and receiver are positioned perpendicular to the direction of movement of film and in which film width and length are either manually determined or are determined by separate apparatus.

Film switch 30 is positioned to sense the presence of film 10 at a predetermined position (illustrated by line 32) along the transport path. In the particular embodiment shown in FIG. 2, line 43 is aligned with the upstream end of scanner 22. The output of film switch 30 is the FS signal, which has a first state when film 10 is present and a second state when film 10 is not present.

Figure 3:
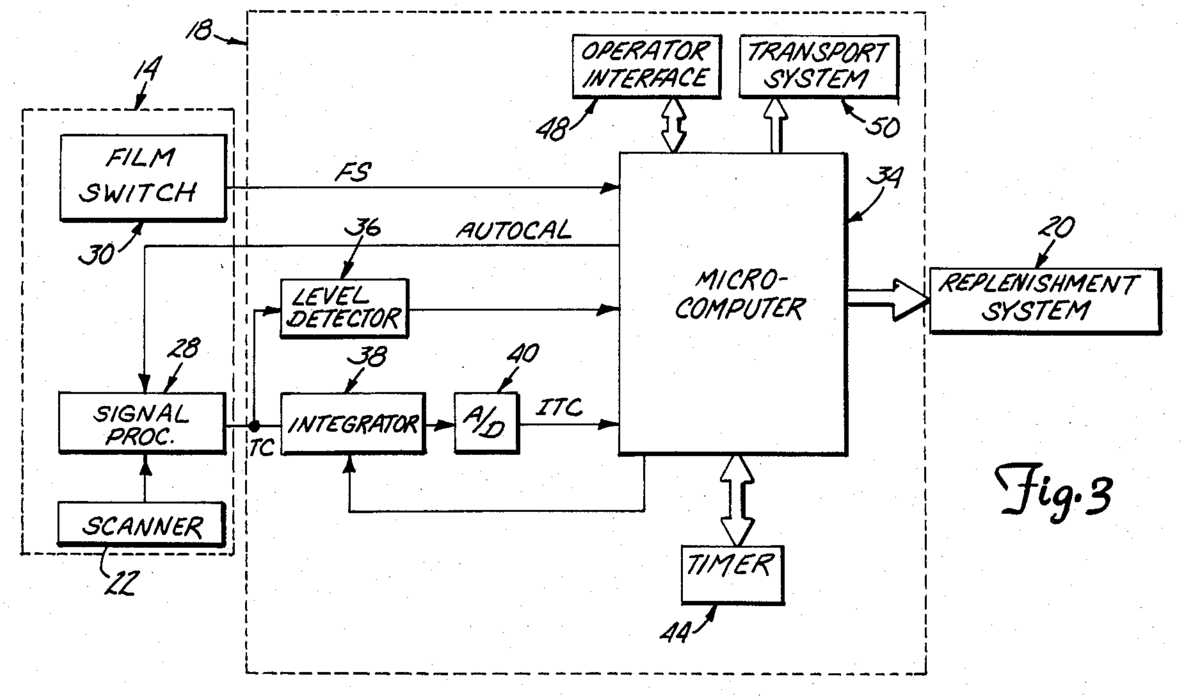
FIG. 3 is a block diagram of the automatic replenisher control system of the processor of FIG. 1.

FIG. 3 is an electrical block diagram showing scanner system 14, control system 18, and replenishment system 20. In the embodiment shown in FIG. 3, control system 18 includes microcomputer 34, level detector 36, integrator 38, analog-to-digital (A/D) converter 40, timer 44, operator interface 48, and transport system 50.

The TC signal from signal processor 28 of scanning system 14 is provided to level detector 36 and integrator 38 of control system 18. Level detector 36 detects a predetermined change in the TC signal level which indicates that at least a portion of film 10 is within the field of vision of scanner 22 (i.e. between light source 24 and receiver 26). The LD output signal from level detector 36 is provided to microcomputer 34.

Integrator 38 integrates the TC signal over time. The output of integrator 38 is converted to a digital signal by A/D converter 40, and is provided as the integrated transmittance complement (ITC) value to microcomputer 34.

The FS signal from film switch 30 is supplied to microcomputer 34. Based upon the FS and LD signals, microcomputer 34 controls high resolution timer 44 to measure a first elapsed time (ET1), a second elapsed time (ET2), and a third elapsed time (ET3).

ET1 is the time interval from activation of film switch 30 by leading edge 10A to the first entrance by leading edge 10A into the field of vision of scanner 22. ET2 is the time interval from activation of film switch 30 by leading edge 10A to release of film switch 30 by trailing edge 10B. ET3 is the time interval from release of film switch 30 by trailing edge 10B to departure of trailing edge 10B from the field of vision of scanner 22.

From ET1, ET2 and ET3, the transport speed of film 10 and skew angle A, microcomputer 34 calculates film length (FL) and film width (FW) of each piece of film 10. Based upon FL, FW, ITC and the replenishment rates for developer and fix replenishment, microcomputer 34 provides replenishment control signals to replenishment system 10.

Operator interface 48 allows an operator to set operating parameters of the graphic arts film processor, including replenishment rates and "time-in-developer" (which determines the transport speed since the rack length of developer tank 12A is known). Microcomputer 34 controls both replenishment system 20 and transport system 50 based upon stored parameters, calculated values, and the operator inputs received from operator interface 48.

FIGS. 4A–4F illustrate the manner in which scanner system 14 provides signals from which length (FL), width (FW) and percentage dot (which corresponds to ITC) are obtained. In FIGS. 4A–4F, the left and right hand edges 11A and 11B of transport path 11 are illustrated for points of reference.

In FIG. 4A, film 10 is approaching scanner system 14. At this point, scanner system 14 is going through a continuous series of automatic calibration cycles under the control of microcomputer 34. These auto-calibration cycles correct for long-term variations and drift in light intensity from light source 24 and for changes in sensitivity of sensing strip 26 due to temperature changes and the like.

In FIG. 4B, leading edge 10A of film 10 triggers film switch 30. At this point, auto-calibration stops, and the most recent calibration level is retained. A scanner sequence is then initiated. In response to the change of state of the FS signal, microcomputer 34 starts timer 44. Film transmittance complement integration by integrator 38 also commences and continues until the trailing edge 10B of film 10 passes out of the field of vision of scanner 22.

In FIG. 4C, the left hand corner of film 10 has just entered the field of vision of scanner 22. This causes a change in the output signal LD from level detector 36 indicating that leading edge 10A has reached scanner 22. Microcomputer 34 reads timer 44 and stores a value corresponding to ET1. At this point, all information is available from which microcomputer 34 can calculate X1, which is the location of left hand edge 10C of film 10.

As shown in FIG. 4C, distance D1 is the distance traveled during first elapsed time ET1. Since ET1 is known, and the film transport speed FTS is known, microcomputer 34 calculates D1 as:

$$D1=(FTS)(ET1) \quad \text{Eq. 1}$$

The location X1 of the left hand edge 10C of film 10 is:

$$X1=(D1)/(\text{TAN } A) \quad \text{Eq. 2}$$

In FIG. 4D, the main body of film 10 is passing through scanner 22. Film 10 is shown at a point where trailing edge 10B is just releasing film switch 30. With the change in the FS signal when trailing edge 10B releases film switch 30, microcomputer 34 again reads timer 44 and stores a value corresponding to ET2. At this point, all data necessary to determine film length FL of film 10 has been obtained. Both film transport speed FTS and second elapsed time ET2 are known. Film length FL is given by:

$$FL=(FTS)(ET2) \quad \text{Eq. 3}$$

FIG. 4E shows the right hand trailing tip of film 10 just leaving the field of vision of scanner 22. At this point, the output of sensing strip 26 (and thus the output of signal processor 28) is no longer changing and has returned to (or very close to) the original value generated during auto-calibration prior to film 10 arriving at scanner system 14 (i.e. as in FIG. 4A). When this condition is detected by level detector 36, transmittance complement integration by integrator 38 is terminated and the output of integrator 38 is converted by A/D converter 40 and provided as the digital ITC value to microcomputer 34.

At the point shown in FIG. 4E, timer 44 is stopped and ET3 is calculated and stored by microcomputer 34. At this point, there is sufficient information to determine the position of the right hand edge 10D of film 10 and, consequently, the film width FW.

As shown in FIG. 4E, distance D2 represents the distance traveled by trailing edge 10B during third elapsed time ET3. X2 represents the distance from left hand border 11A to right hand edge 10D of film 10. Microcomputer 34 calculates D2, X2 and FW as follows:

$$D2=(FTS)(ET3) \quad \text{Eq. 4}$$

$$X2=(D2)/(\text{TAN } A) \quad \text{Eq. 5}$$

$$FW=X2-X1 \quad \text{Eq. 6}$$

Since both film width FW and film length FL are known, microcomputer 34 has the information necessary to determine film area FA.

$$FA=(FW)(FL) \quad \text{Eq. 7}$$

Microcomputer 34 then determines the developer replenishment volume DRV and the fix replenishment volume FRV and provides the appropriate replenishment control signals to replenishment system 20.

$$DRV=(K1)(ITC) \quad \text{Eq. 8}$$

where

K1=a constant related to development replenishment rate, and

ITC=integral of the transmittance complement over the full width of scanner 22 for the length of film 10.

$$FRV=(FA)(K2)/(ITC) \quad \text{Eq. 9}$$

where K2=a constant related to fix replenishment rate.

FIG. 4F shows film 10 leaving scanner system 14. At this point, scanner system 14 is returned to the auto recalibration mode, and is ready for the next piece of film.

With the present invention, there are several factors which affect the resolution of the film width determination. One factor is the relative positions of light source 24, receiver 26 and film 10. The upward viewing angle at which photovoltaic cells respond to light is normally quite wide. When used in scanning system 14, this can reduce the sensitivity of scanner 22 to leading or trailing edge 10A or 10B of film 10.

FIG. 5 is a sectional view showing an example of the loss of resolution in a scanner using a narrow light source 24′ and a wide aperture photovoltaic cell receiver 26′ positioned so that film 10 passes approximately equally between light source 24′ and receiver 26′. In FIG. 5, leading edge 10A of film 10 is just about to enter the field of vision of the scanner. Because the light from light source 24′ is reflected and dispersed by film 10 onto receiver 26′ at varying angles, the resolution of detecting leading edge 10A is fuzzy and not sharply defined. In other words, the arrangement shown in FIG. 5 does not produce a sharp change in output at a specific point in film travel.

FIG. 6 shows one improved embodiment of a scanner which achieves greater resolution. In FIG. 6, receiver 26″ has a narrower aperture than receiver 26′ of FIG. 5. In addition, receiver 26″ is much closer spaced to film 10 than is light source 24″. By using a narrower aperture receiver 26″, film edge 10A will enter and cover the entire width of receiver 26″ in a shorter period of time for a given transport speed. Also, by having film 10 enter the region of receiver 26″ at a closer distance, the effects of reflection and dispersion are reduced. This produces a sharper defined film edge position as film 10 enters the field of vision of the scanner.

FIG. 7 shows an alternative scanner embodiment for improving resolution of film position. In this embodiment, aperture plate 60, which has a narrow slit aperture 61, is positioned between point light source 24‴ and receiver 26‴. Film 10 passes over aperture plate 60. The field of vision of receiver 26‴ is limited by aperture 61, so that the effects of dispersion and reflection are substantially reduced. The use of aperture plate 60 allows greater flexibility in the relative mechanical positioning of the film path and receiver 26‴, while still providing increased resolution.

Another factor in film width resolution is the value of skew angle A. In the present invention, skew angle A is greater than 0° and less than 90°. The greater the value of skew angle A, the better the film width resolution. On the other hand, the greater the value of skew angle A, the greater the physical length of scanner system 14 in the direction of film travel in order for scanner 22 to cover the width of transport path 11. A large skew angle A can increase the overall length of the graphic arts film processor, or can make it difficult to place scanner system 14 in a convenient location (such as in a first vertical travel path of dryer 16).

In addition, if a large skew angle A is maintained for the sake of film width resolution, a larger gap between successive films 10 must be provided. Film width determination in the present invention depends on having only one film 10 at a time within the field of vision of scanner 22.

Another consideration in the use of a single scanner 22 (as shown in FIGS. 2 and 4A–4F) involves processing of roll film (i.e. a very long web of film rather than a relatively short sheet). With the present invention, film width is not determined until the trailing edge 10B of film 10 leaves the field of vision of scanner bar 22. Since fix replenishment volume FRV is a function of film area FA, it is not possible to determine FRV until film 10 clears scanner bar 22. If a piece of roll film is of considerable length, the fix solution may be depleted before FRV can be determined.

This does not present a problem, of course, with developer replenishment since determination of developer replenishment volume DRV does not require a determination of the film area. This is because "no film" and "clear film" require the same volume of developer replenishment: none. Thus only the integrated transmittence complement ITC (which corresponds to % dot) affects developer replenishment, while film area FA must be known to determine fix replenishment volume FRV.

There are several ways in which fix replenishment for roll film can be handled with the present invention. In one embodiment, during roll film operation a predetermined average volume of fix replenishment is added on a per unit length basis. When film width FW is finally determined, make-up fix is then added at that time if fix replenishment has been low. If on the other hand, fix replenishment has been too high, the predetermined average volume of fix replenishment during the next film replenishment is reduced by the amount of excess fix replenishment which was delivered with the preceding film.

In another embodiment during roll film operation, film width is selected manually through operator interface 48. In this embodiment, microcomputer 34 uses the manually entered film width rather than the film width determined from the FS and TC signals of scanner system 14.

In still another embodiment shown in FIG. 8, scanner system 74 includes a plurality of parallel scanners 22A–22D rather than a single continuous scanner 22 as shown in FIG. 2. Each of the scanners 22A–22D is oriented at skew angle A. The upstream ends of scanners 22A–22D are aligned in a transverse direction, as are the downstream ends of scanners 22A–22D.

Each scanner 22A–22D provides output signals to a corresponding signal processor 28A–28D. The outputs of signal processors 28A–28D are signals TCA–TCD. This permits microcomputer 34 to collect data from scanners 22A–22D on an individual basis.

The embodiment shown in FIG. 8, with its use of independent, shorter scanners 22A–22D, resolves some of the mechanical and functional trade-offs associated with a single scanner 22 (as shown in FIG. 2). First, the mechanical length (in the direction of film travel) of scanner system 14 of FIG. 8 is much shorter than scanner system 14 of FIG. 2 having a single unit scanner 22 with the same skew angle A. This eliminates the need for an excessive gap between successive films 10, while still retaining good film width resolution associated with a large skew angle.

Second, in the roll film mode it is possible to obtain a close approximation of film width prior to the trailing edge 10B of film 10 exiting the field of vision of scanners 22A–22D. This allows fix replenishment to commence at timed intervals during the processing of a long roll of film without having to manually set the film width. In the example shown in FIG. 8, film 10 has sufficient width to pass through scanners 22B–22D. As film 10 passes through scanner system 14, film switch 30 is activated and then the outputs of scanners 22B–22D all change while the output of scanner 22A remains unchanged. This indicates to microcomputer 34 that film 10 is wider than one scanner width and no greater than three scanner widths. Since film width is originally sensed at low resolution, make-up fix replenishment is added at the end of the film or if too much fix replenishment was added, that volume of fix replenishment is withheld from the next replenishment cycle.

Although in FIG. 8 four scanners 22A–22D are shown, it can be seen that in other embodiments different numbers of scanners are used. For example, by increasing the number of scanners, a larger skew angle A can be achieved while maintaining the same overall length of the scanning system 14 in the direction of travel of film 10. A large number of scanners also increases the accuracy of the width approximation for roll film processing.

In preferred embodiments, the field of vision of each scanner in the transverse or width direction abuts but does not substantially overlap the field of vision of the adjacent scanner or scanners. This allows the ITC values derived from the scanners to be summed without any corrections for overlapping or spaced apart fields of vision (which would produce inaccuracies in developer and fix replenishment).

Although the present invention has been described with reference to preferred embodiments, workers skilled in the art will recognize that changes may be made in form and detail without departing from the spirit and scope of the invention.

What is claimed is:

1. A control system for automatic replenishment in a film processor, the processor containing a plurality of tanks, a transport system for moving the film along a transport path through the tanks, and means for providing replenishment as a function of replenishment control signals, the control system comprising:

means for producing a scanner signal which is a function of transmittance in a field of vision which is oriented at a skew angle A with respect to a direction transverse to film movement, where A is greater than 0° and less than 90°, the scanner signal exhibiting a change when a leading edge of the film first enters the field of vision and a change when a trailing edge of the film leaves the field of vision;

means positioned at a predetermined location along the transport path with respect to the field of vision for indicating when the leading edge of the film reaches the predetermined location and when the trailing edge of the film leaves the predetermined location;

means for measuring a first elapsed time from when the leading edge reaches the predetermined location to when the leading edge enters the field of vision;

means for measuring a second elapsed time from when the leading edge reaches the predetermined location until the trailing edge leaves the predetermined location;

means for measuring a third elapsed time from when the trailing edge leaves the predetermined location to when the trailing edge leaves the field of vision;

means for determining film width as a function of the first elapsed time, the third elapsed time, the skew angle A, and film transport speed;

means for determining film length as a function of the second elapsed time and the film transport speed; and means for producing the replenishment control signals as a function of the film width, the film length of the scanner signal.

2. The control system of claim 1 wherein the means for producing the replenishment control signals comprises:

means for integrating the scanner signal while the film is within the field of vision;

means for producing a developer replenishment control signal as a function of the integrated scanner signal; and means for producing a fix replenishment control signal as a function of the film width, the film length and the integrated scanner signal.

3. The control system of claim 1 and further comprising:

means for calibrating the scanner signal when no film is present at the predetermined location.

4. The control system of claim 1 wherein the means for producing a scanner signal comprises:

light source means positioned on one side of the transport path for providing light; and receiver means positioned on an opposite side of the transport path for receiving the light from the light source means.

5. The control system of claim 4 wherein the light source means comprises a first elongated light source oriented at skew angle A and wherein the receiver means comprises a first elongated light receiver positioned opposite and parallel to the first elongated light source.

6. The control system of claim 5 wherein the scanner signal is a function of integrated intensity of light received by the first elongated light receiver.

7. The control system of claim 6 wherein the receiver means produces an output signal which is a function of the integrated intensity and wherein the means for producing a scanner signal further comprises:

signal processor means for converting the output signal from the receiver means to produce the scanner signal which represents a transmittance complement.

8. The control system of claim 5 wherein the light source means further comprises a second elongated light source parallel to the first elongated light souce; and wherein the receiver means further comprises a second elongated light receiver positioned opposite the second elongated light source and parallel to the first elongated light receiver.

9. The control system of claim 4 wherein the receiver means is positioned closer to the transport path than the light source means.

10. The control system of claim 4 and further comprising an aperture plate positioned between the transport path and the receiver means and having a slot aperture oriented at skew angle A.

11. The control system of claim 1 wherein the field of vision comprises a plurality of parallel subfields of vision, each subfield being oriented at skew angle A.

12. The control system of claim 11 wherein the subfields of vision have upstream ends essentially aligned in a transverse direction which is transverse to a longitudinal direction of movement of the film along the transport path, and wherein the subfields of vision have downstream ends essentially aligned in the transverse direction.

13. The control system of claim 12 wherein the subfield of vision abut without substantially overlapping in the transverse direction.

14. A control system for automatic developer and fix replenishment in a graphic arts half-tone film processor, the processor containing a plurality of tanks, a transport system for moving the film along a transport path through the tanks, and means for replenishing developer and fix in the processor as a function of developer and fix replenishment control signals, respectively, the control system comprising:

scanner means for producing a scanner signal which is a function of transmittance in a field of vision which is oriented at a skew angle A with respect to a direction transverse to film movement, where A is greater than 0° and less than 90°, the scanner signal exhibiting a change when a leading edge of the film first enters the field of vision and a change when a trailing edge of the film leaves the field of vision;

film switch means positioned at a predetermined location along the transport path with respect to the field of vision for indicating when the leading edge of the film reaches the predetermined location and when the trailing edge of the film leaves the predetermined location;

means for measuring a first elapsed time from when the leading edge reaches the predetermined location to when the leading edge enters the field of vision;

means for measuring a second elapsed time from when the leading edge reaches the predetermined location until the trailing edge leaves the predetermined location;

means for measuring a third elapsed time from when the trailing edge leaves the predetermined location to when the trailing edge leaves the field of vision;

means for determining film width as a function of the first elapsed time, the third elapsed time, the skew angle A and film transport speed;

means for determining film length as a function of the second elapsed time and the film transport speed;

means for integrating the scanner signal while the film is within the field of vision to produce an integrated scanner signal; and means for producing the developer replenishment control signal as a function of the integrated scanner signal; and means for producing the fix replenishment control signal as a function of the film width, the film length and the integrated scanner signal.

15. The control system of claim 14 and further comprising:

means for calibrating the scanner signal when no film is present at the predetermined location.

16. The control system of claim 14 wherein the scanner means comprises:

light source means positioned on one side of the transport path for providing light; and receiver means positioned on an opposite side of the transport path for receiving the light from the light source means and providing a receiver output signal.

17. The control system of claim 16 wherein the light source means comprises a first elongated light source oriented at skew angle A and wherein the receiver means comprises a first elongated light receiver positioned opposite and parallel to the first elongated light source.

18. The control system of claim 17 wherein the receiver output signal is a function of integrated intensity of light received by the first elongated light receiver.

19. The control system of claim 18 wherein the scanner means further comprises:

signal processor means for converting the receiver output signal to produce the scanner signal which represents a transmittance complement.

20. The control system of claim 16 wherein the light source means further comprises a second elongated light source parallel to the first elongated light source; and wherein the receiver means further comprises a second elongated receiver positioned opposite the second elongated light source and parallel to the first elongated light receiver.

21. The control system of claim 16 wherein the receiver means is positioned closer to the transport path than the light source means.

22. The control system of claim 16 and further comprising an aperture plate positioned between the transport path and the receiver means and having a slot aperture oriented at skew angle A.

23. The control system of claim 14 wherein the field of vision comprises a plurality of parallel subfields of vision, each subfield being oriented at skew angle A.

24. The control system of claim 23 wherein the subfields of vision have upstream ends essentially aligned in a transverse direction which is transverse to a longitudinal direction of movement of the film along the transverse path, and wherein the subfields of vision have downstream ends essentially aligned in the transverse direction.

25. The control system of claim 24 wherein the subfields of vision abut without substantial overlapping in the transverse direction.

26. The control system of claim 23 wherein the scanner means comprises:

a plurality of parallel elongated light sources, each light source oriented at skew angle A; and a plurality of elongated light receivers positioned on an opposite side of the transport path from the plurality of light sources, each light receiver being oriented at skew angle A and parallel and opposite to one of the plurality of light sources.

27. A control system for automatic replenishment of fluids in a processor of photosensitive material, the processor containing a plurality of tanks, a transport system for driving the photosensitive material in a longitudinal direction along a transport path through the tanks, and means for replenishing fluids in the processor as a function of control signals, the control system comprising:

means for scanning across at least a portion of the transport path along a scan line which is oriented at a skew angle A with respect to a transverse direction, where A is greater than 0° and less than 90°, to produce a scanner signal representative of transmittance along the scan line, the scanner signal exhibiting a change when a leading edge of the photosensitive material interrupts the scan line and a change when a trailing edge of the photosensitive material no longer interrupts the scan line;

means positioned at a predetermined location along the transport path with respect to the scan line for exhibiting a first state which indicates that photosensitive material is not present, and a second state which indicates that photosensitive material is present;

means for measuring a first elapsed time between a first change of state from the first state to the second state and the change in the scanner signal when the leading edge interrupts the scan line;

means for measuring a second elapsed time between the first change of state and a second change of state from the second state to the first state;

means for measuring a third elapsed time between the second change of state and the change in the scanner signal when the trailing edge no longer interrupts the scan line;

means for determining width of the photosensitive material as a function of the first elapsed time, the third elapsed time, the skew angle A and transport speed;

means for determining length of the photosensitive material as a function of the second elapsed time and the transport speed;

means for producing an integral signal indicative of an integral of the scanner signal; and means for producing a replenishment control signal as a function of the length, width and the integral signal.

28. The control system of claim 27, the means for scanning comprising:

light source means for producing a line of light which passes through the transport path; and light receiver means positioned parallel to and on an opposite side of the transport path from the light source means for detecting the line of light therefrom.

29. The control system of claim 27 wherein the means for determining length determines the length of the photosensitive material as a function of the second elapsed time and a film travel speed at which the photosensitive material is driven by the transport system.

30. The control system of claim 27 wherein the means for scanning undergoes automatic calibration when no photosensitive material is present at the predetermined location.

31. A control system for automatic replenishment of fluids in a processor of photosensitive material, the processor containing a plurality of tanks, a transport system for driving the photosensitive material along a transport path through the tanks, and means for replenishing fluids in the processor as a function of control signals, the control system comprising:

means for scanning across the transport path along a plurality of parallel scan lines which are oriented at a skew angle A with respect to a transverse direction of the transport path, where A is greater than 0° and less than 90°, to produce scanner signals representative of transmittance along the scan lines, each scanner signal exhibiting a change when a leading edge of the photosensitive material interrupts a corresponding scan line and a change when a trailing edge of the photosensitive material no longer interrupts the corresponding scan line;

means positioned at a predetermined location along the transport path with respect to the scan lines for exhibiting a first state which indicates that the photosensitive material is not present, and a second state which indicates that the photosensitive material is present;

means for measuring a first elapsed time between a first change of state from the first state to the second state and the change in at least one of the scanner signals when the photosensitive material interrupts the corresponding scan line;

means for measuring a second elapsed time between the first change of state and a second change of state from the second state to the first state;

means for measuring a third elapsed time between the second change of state and the change in at least one of the scanner signals when the photosensitive material no longer interrupts the corresponding scan line;

means for determining width of the photosensitive material as a function of the first elapsed time, the third elapsed time, skew angle A and transport speed;

means for determining length of the photosensitive material as a function of the second elapsed time and the transport speed; and means for producing the control signal as a function of the length; width and the scanner signals.

32. The control system of claim 31 wherein the scanner means comprises:

a plurality of light sources for producing parallel light beams which pass through the transport path to define the plurality of parallel scan lines; and a plurality of light receivers positioned parallel to and on an opposite side of the transport path from the plurality of light sources for detecting the light beams therefrom and producing the scanner signals.

33. A method for determining an amount of replenishment needed for a processor of photosensitive material, the method comprising:

scanning along a scan line oriented at a predetermined skew angle A with respect to a transverse direction which is greater than 0° and less than 90° to measure transmittance of light through the photosensitive material as it is moved along a transport path in the processor at a predetermined transport speed to produce a scanner signal;

providing a first signal when a leading edge of the photosensitive material passes a predetermined location along the transport path;

detecting a first change in the scanner signal when the leading edge of the photosensitve material interrupts the scan line;

measuring a first elapsed time between the first signal and the first change;

determining location of a first side of the photosensitive material as a function of the first elapsed time, the transport speed and the skew angle A;

providing a second signal when a trailing edge of the photosensitive material passes the predetermined location;

measuring a second elapsed time between the first signal and the second signal;

detecting a second change in the scanner signal when the trailing edge of the photosensitive material no longer interrupts the scan line;

measuring a third elapsed time between the second signal and the second change in the scanner signal;

determining the length of the sheet as a function of the second elapsed time and the transport speed;

determining location of a second side of the photosensitive material as a function of the third elapsed time, the transport speed and the skew angle A;

determining width of the photosensitive material based upon the locations of the first and second sides; and determining replenishment as a function of the scanner signal length and width.

* * * * *